(12) United States Patent
Stromquist et al.

(10) Patent No.: US 7,805,341 B2
(45) Date of Patent: Sep. 28, 2010

(54) EXTRACTION, TRANSFORMATION AND LOADING DESIGNER MODULE OF A COMPUTERIZED FINANCIAL SYSTEM

(75) Inventors: Peter J. Stromquist, Little Canada, MN (US); Bryan D. Schoening, Parker, CO (US); Demetrius A. Austin, Denver, CO (US)

(73) Assignee: Microsoft Corporation, Redmond, WA (US)

( * ) Notice: Subject to any disclaimer, the term of this patent is extended or adjusted under 35 U.S.C. 154(b) by 1933 days.

(21) Appl. No.: 10/823,145

(22) Filed: Apr. 13, 2004

(65) Prior Publication Data

US 2005/0228728 A1    Oct. 13, 2005

(51) Int. Cl.
    *G07B 17/00* (2006.01)
(52) U.S. Cl. .................................................. 705/30
(58) Field of Classification Search .............. 705/1, 705/30; 715/239
    See application file for complete search history.

(56) References Cited

U.S. PATENT DOCUMENTS

| | | | |
|---|---|---|---|
| 5,680,614 A | 10/1997 | Bakuya et al. | 707/103 R |
| 5,701,461 A | 12/1997 | Dalal et al. | 707/4 |
| 6,356,901 B1 | 3/2002 | MacLeod et al. | 707/6 |
| 6,631,382 B1 | 10/2003 | Kouchi et al. | 707/102 |
| 6,668,253 B1 | 12/2003 | Thompson et al. | 707/10 |
| 6,694,306 B1 | 2/2004 | Nishizawa et al. | 707/3 |
| 6,996,568 B1 | 2/2006 | Bedell et al. | 707/100 |
| 7,203,660 B1* | 4/2007 | Majeed | 705/27 |
| 2001/0047372 A1* | 11/2001 | Gorelik et al. | 707/514 |
| 2002/0065744 A1 | 5/2002 | Collins | 705/27 |
| 2003/0208460 A1 | 11/2003 | Srikant et al. | 707/1 |
| 2004/0059651 A1 | 3/2004 | MaGuire et al. | 705/30 |
| 2004/0064331 A1 | 4/2004 | Mayer et al. | 705/1 |
| 2005/0144554 A1 | 6/2005 | Salmon et al. | 715/501.1 |
| 2008/0030348 A1* | 2/2008 | Pape et al. | 340/573.3 |

OTHER PUBLICATIONS

"Manugistics and Acta Announce Strategic Alliance to Provide Higher Volume Data Integration for Enterprise Profit Optimization." Business Wire, Nov. 12, 2001: p. 2499.*
"Data Transformation Services (DTS) in Microsoft SQL Server 2000," Sep. 2000, pp. 1-10.
Ileana Balcu, Dulcian, Inc., "Don't Build 200 Reports, Build Just One!", Jan. 13, 2004, pp. 1-7.
Brad Eldredge, "Oracle General Ledger Technical Foundation", Aug. 20, 1999, pp. 1-41.

(Continued)

*Primary Examiner*—Matthew S Gart
*Assistant Examiner*—Oluseye Iwarere
(74) *Attorney, Agent, or Firm*—Westman, Champlin & Kelly, P.A.

(57) ABSTRACT

An extraction, transformation and loading (ETL) designer module of a computerized financial system that is used to configure an ETL package for loading data elements from a financial table of a financial database into a reporter table in accordance with a predefined format. The ETL designer module includes a transformation class that defines transformation objects. Each transformation object is responsible for a transformation of the source data elements of a source column of the financial table into a reporter format of an associated destination column of the reporter table.

8 Claims, 8 Drawing Sheets

OTHER PUBLICATIONS

Mary Lou Weiss and Randy Giefer, Solution Beacon, LLC, Oracle Applications Release 11i Newsletter, Jun. 2003, vol. No. 10, pp. 1-22.

Randy Giefer, Computer Systems Authority, "Release 11I Applicattions DBA-Teaching An Old Dog New Tricks", published at least as early as Mar. 26, 2004, pp. 1-9.

"Together with Cognos Business Intelligence, Decisionstream Builds an Efficient End-to-End Business Solution—From the Rapid Integration of Disparate Data Sources to Efficient Analysis and Reporting on a Consistent Data Foundation," COGNOS, pp. 1 and 2; May 2001.

Felipe Cariño Jr., Pekka Kostamaa, Art Kaufmann & John Burgess, "New Applications for Database, Storage & Data Warehousing," StorHouse Metanoia[1], pp. 521-531, 2001.

Tim Chenoweth, David Schuff and Robert S. Louis, "A Method for Developing Dimensional Data Marts," Communications of the ACM, pp. 93-98, vol. 46, No. 12, Dec. 2003.

Diane Larsen and Euan Garden, "Data Transformation Services (DTS) in Microsoft SQL Server 2000," in Microsoft SQL Server 2000, pp. 1-11.

European Search Report for Application No. EP 05 10 2630, Filing date of Apr. 4, 2005, Date of Mailing: Oct. 26, 2005.

Selector, LEV: "Informatica" Internet Article, "Online!, Dec. 23, 2003, XP002349346, 6 pages.

Anonymous: "Oracle9I Warehouse Builder 9.2", Oracle Technology Network, "Online! 2003, XP002349347, 6 pages.

Anonymous: "Sunopsis: New Generation ETL for Business Object," Internet Article, "Online! 2003, XP-002349348, 2 pages.

Anonymous: "Intelligent Decision Support System—IDSS", Intelligent Science Research Group, Key Lab of IIP, "Online! 2003, XP-002349349, 3 pages.

* cited by examiner

| Reference | Code 1 | Code 2 | Date | Debit | Credit |
|---|---|---|---|---|---|
| 100-50 | 44 | A22 | 3/1/2004 | 1245.00 | |
| 100-51 | 44 | A22 | 3/7/2004 | | 825.33 |
| 100-52 | 41 | A12 | 4/2/2004 | | 76.83 |
| 100-54 | 53 | C12 | 2/12/2004 | | 565.00 |

FIG. 3

| Period | 1 | 2 | 3 | 4 |
|---|---|---|---|---|
| Starting Balance | 1231.34 | 2372.78 | 4345.23 | 3768.92 |
| Ending Balance | 2372.78 | 4345.23 | 3768.92 | 4621.76 |

| Reference | Code | Date | Debit | Credit |
|---|---|---|---|---|
| 10050 | 44A22 | 3/1/2004 | 1245.00 | |
| 10051 | 44A22 | 3/7/2004 | | 825.33 |
| 10052 | 41A12 | 4/2/2004 | | 76.83 |
| 10054 | 53C12 | 2/12/2004 | | 565.00 |

FIG. 8

| Period | Starting Balance | Ending Balance |
|---|---|---|
| 1 | 1231.34 | 2372.78 |
| 2 | 2372.78 | 4345.23 |
| 3 | 4345.23 | 3768.92 |
| 4 | 3768.92 | 4621.76 |

EXTRACTION, TRANSFORMATION AND LOADING DESIGNER MODULE OF A COMPUTERIZED FINANCIAL SYSTEM

BACKGROUND OF THE INVENTION

The present invention generally relates to an Extraction, Transformation and Loading (ETL) designer module of a computerized financial system that operates to communicate instructions to ETL services module of a server to configure ETL packages. The ETL packages are used to extract, transform and load elements from a source financial table contained in a source database or data store into a destination table of a destination database or data store having a predefined format that is independent of the format of the first table.

Computerized financial systems include various software packages including accounting programs and financial reporting programs. The accounting programs maintain various accounts for the business such as a general ledger, inventory, accounts receivable, accounts payable, balances, payroll and other accounts. The general ledger is a storehouse for financial activity and history of a company, which contains all of the financial transactions for the company. The general ledger and other accounts are typically stored as tables (financial tables) in one or more databases.

Financial reporting applications utilize the data stored in the financial tables of the databases to generate reports. Such reports can include balance reports and forecasting reports, for example.

The databases that contain the financial tables of a business are conventionally organized and maintained using a variety of Database Management Systems (DBMS). Among such database systems, are those adhering to a "relational" model which are recognized as Relational Database Management Systems (RDBMS). A relational database is a collection of data that is organized in related two-dimensional tables of columns and rows. Data in a table can be accessed and manipulated by performing set operations on the tables, such as join, sort, merge, and so on. These operations are typically initiated by way of a user-defined query that is constructed in a query language such as Structured Query Language (SQL). SQL queries consist of high level commands which typically describe the data set to be selected, retrieved or processed.

As mentioned above, the financial reporting programs need to access the financial information of the business in one or more financial tables to extract information that will be utilized to form the report. Some prior art financial reporting programs or tools include program code (e.g., SQL statements) in their software to directly access particular financial tables of a database. One problem with such an approach is that, when a financial table is modified or added, the program code of the reporting program needs to be modified to provide access to the modified or new financial table. Such modifications are complex, time consuming and expensive to complete.

An alternative approach to the above is to make use of existing Extraction Transformation and Loading (ETL) services provided with some servers. ETL services provide a set of tools for extracting, transforming and consolidating data from disparate sources into single or multiple destinations to build data warehouses or data marts in accordance with a predefined format. Data Transformation Services (DTS) of Microsoft® SQL Server is one example of an ETL service.

ETL services allow for the creation of ETL packages (DTS Packages for Microsoft® SQL Server) that define custom data movement solutions that are tailored to the financial reporting application. Each ETL package generally defines multiple steps of associated tasks that operate to perform the desired extraction and transformation of the data elements contained in the source table. Additionally, execution of the ETL package causes the ETL to import the specified source data of the source table, transform the data into the desired format, and export the data to the destination table in the destination database on store. As a result, such ETL services can be used to form an ETL package that moves selected data elements from a source financial table (e.g., a general ledger), transform the data elements into a desired format, and load the data elements into a reporter table that is ready for use by the financial reporting application. Additionally, modifications can be made directly to the ETL packages to accommodate desired modifications without having to modify the program code of the financial reporting application.

Although the use of such ETL services avoids the need to customize the reporter application code to a particular financial table, the ETL packages that define the custom data movement must still be programmed and configured. ETL services include a user interface (such as Enterprise Manager for DTS of Microsoft® SQL Server) that allows the user to directly configure the DTS Packages. Such programming is time-consuming and must be performed by someone that not only has a complete understanding of the destination table that is desired by the financial reporting application including the desired source data and the desired format of the data, but also a knowledge of how to program or configure the ETL packages to perform the extraction, transformation and loading steps. Additionally, the configuring of the ETL packages can be complex due to the multiple steps and associated tasks that must be manually entered to perform the desired data extraction, transformation, or loading operation.

A need exists for improved methods of programming or configuring ETL packages for use by financial reporting applications including making such configuring methods more efficient and user friendly.

SUMMARY OF THE INVENTION

The present invention is generally directed to an extraction, transformation and loading (ETL) designer module of a computerized financial system that is used to configure ETL packages. Each ETL package can be used for loading data elements from one or more financial tables of a financial database into a reporter table in accordance with a predefined format. The ETL designer module includes a transformation class that defines transformation objects. Each transformation object is responsible for a transformation of the source data elements of a source column of the financial table into a reporter format of an associated destination column of the reporter table.

In accordance with one embodiment of the invention, the transformation includes a substitution of at least a portion of the source data elements with a predefined substitution element.

In accordance with another embodiment of the invention, the transformation includes a parsing of the source data elements.

In accordance with yet another embodiment of the invention, the transformation includes a concatenation of the source data elements of two or more source columns.

In accordance with another embodiment of the invention, the transformation includes a pivot of the source data elements of the source column.

DETAILED DESCRIPTION OF ILLUSTRATIVE EMBODIMENTS

The present invention generally relates to an extraction, transformation and loading (ETL) designer module of a computerized financial system that operates to communicate instructions to an ETL services module of a server to configure ETL packages. Each ETL package is used to extract, transform and load source elements from a source table contained in a source database into a destination table of a destination database having a predefined format that is independent of the format of the source table.

Computing Environment Overview

Figure 1:
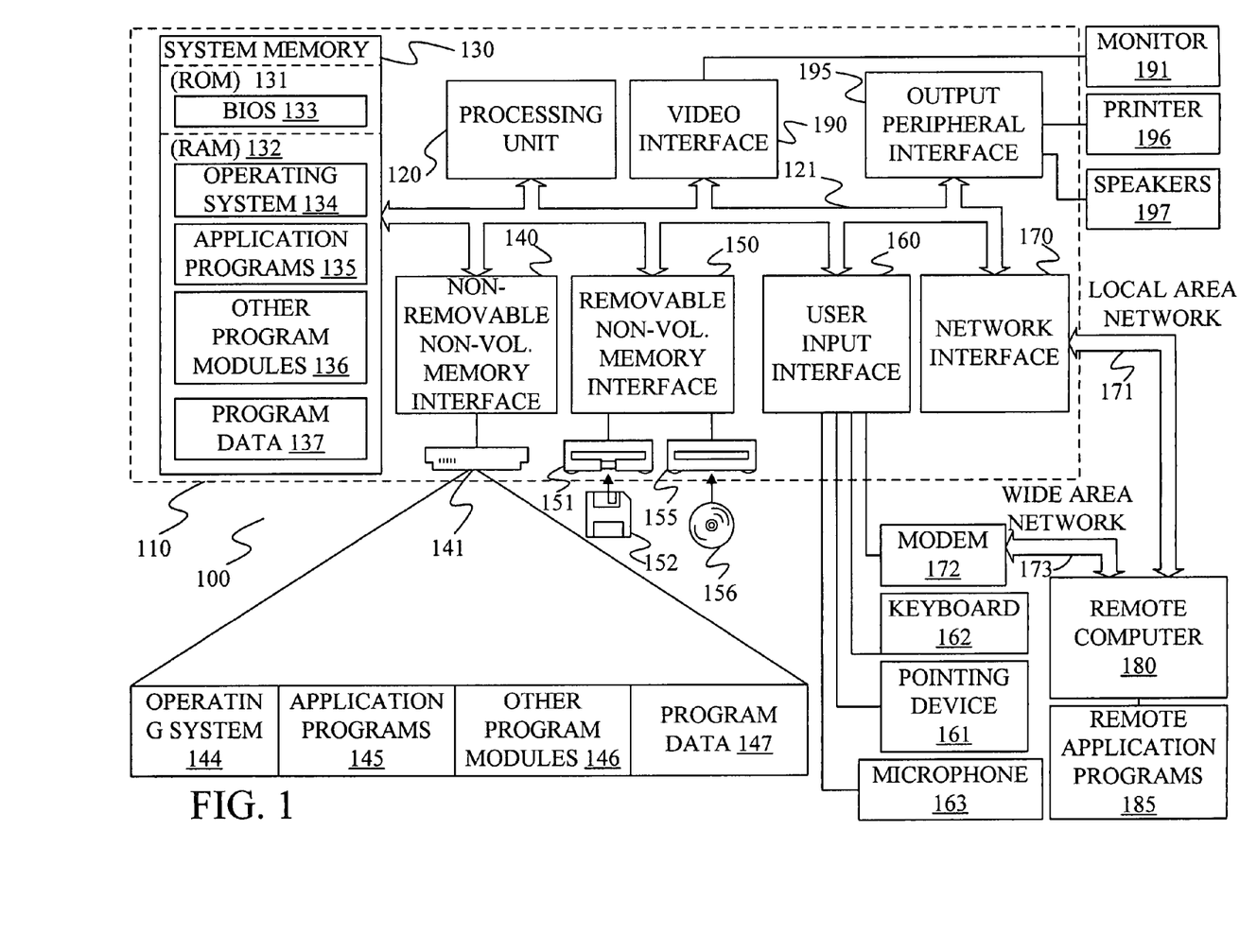
FIG. 1 is a block diagram illustrating an environment in which the present invention may be used.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

As noted above, the present invention can be carried out on a computer system such as that described with respect to FIG. 1. Alternatively, the present invention can be carried out on a server, a computer devoted to message handling, or on a distributed system in which different portions of the present invention are carried out on different parts of the distributed computing system.

Computerized Financial System

Figure 2:
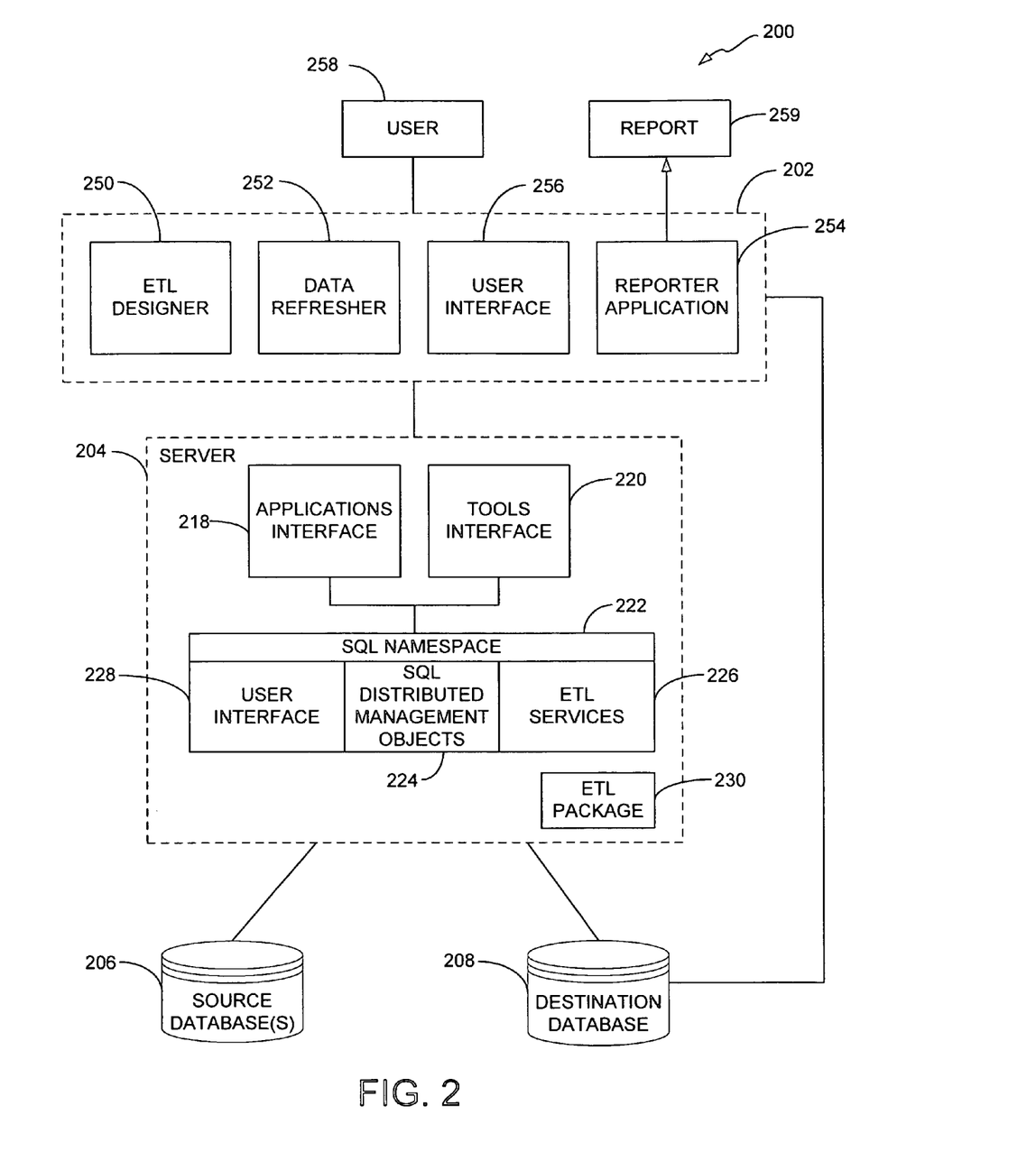
FIG. 2 is a simplified block diagram of a computerized financial system in accordance with embodiments of the invention.

FIG. 2 is a schematic diagram of a computerized financial system 200 in accordance with various embodiments of the invention. System 200 generally includes a financial reporting software package 202, a server 204, a source financial database 206, and a destination reporter database 208. Financial database 206 generally includes a collection of related data, such as the financial transactions of a business, and is preferably a relational database in which data is organized in a two-dimensional column and row form called a financial table.

A relational database typically includes multiple tables. A database typically will also include associative structures. An example of an associated structure is an index, typically, but not necessarily, in the form of B-tree or hash index. An index provides for seeking to a specific row in a table with a near constant access time regardless of the size of the table. Associative structures are transparent to the users of the database but are necessary for efficient operation and control of the database management system.

A database management system (DBMS), particularly a relational database management system (RDBMS), is a control system that supports database features including, but not limited to, storing data on a memory medium, retrieving data from the memory medium and updating data on the memory medium.

Figure 3:
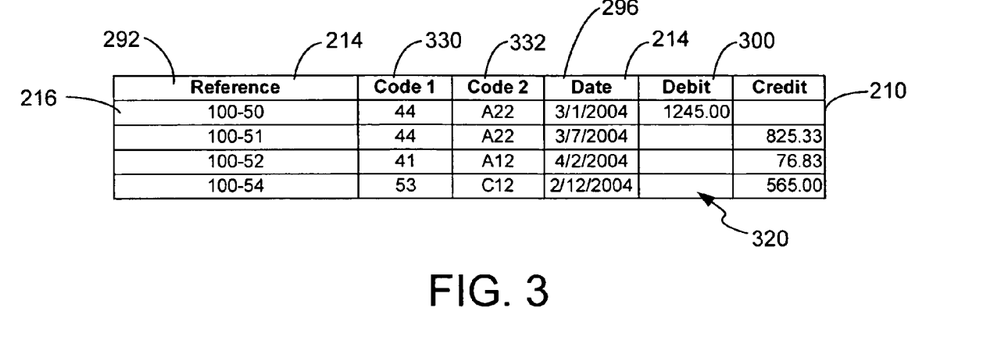
FIGS. 3 and 4 are exemplary source financial tables.
Figure 4:
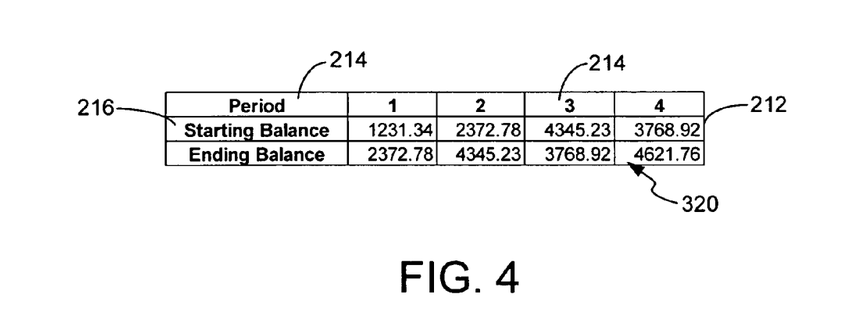

The exemplary financial database 206 includes a general ledger table 210 and a balance table 212, which are shown in FIGS. 3 and 4, respectively. Each table comprises columns 214 and rows 216. Exemplary general ledger table 210 comprises multiple columns 214 including Reference, Code 1, Code 2, Date, Debit, and Credit fields for the columns. Columns 214 in balance table 212 include Period, 1, 2, 3, and 4 fields for the columns. Financial database 206 also includes an index table (not shown) that contains information regarding each table in the database.

Generally, data stored in a relational database is accessed by way of a user-defined query that is constructed in a query language such as SQL. Typically, for any given SQL query there are numerous procedural operations that need to be performed on the data in order to carry out the objectives of the SQL query. For example, there may be numerous joins and table scans that need to be performed so as to accomplish the desired objective.

The exemplary server 204 of FIG. 2 has a simplified SQL server RDBMS architecture that essentially comprises three layers. Layer one provides at least two classes of integration with the SQL server including an Applications interface 218 that allows integration of a server interface into user applications such as Distributed Component Object Modules (DCOM), and a Tools Interface 220 that provides an interface for integration of administration and configuration tools developed by independent software vendors.

Layer two opens the functionality of the SQL server 204 to other applications by providing Application Programming Interfaces (API) including SQL namespace 222, SQL Distributed Management Objects 224, and ETL services 226. A user interface 228 is provided by Wizards, HTML, and so on.

SQL Distributed Management Objects API 224 abstracts the use of DDL, systems stored procedures, registry information, and operating system resources, providing an API to all administration and configuration tasks for the SQL server.

(ETL) Services API 226 exposes the services provided by SQL server 204, or other server product, to aid in building data warehouses and data marts and preferably includes a data pump application. As described more fully below, these services provide the ability to transfer and transform data between heterogeneous data sources in accordance with ETL packages 230 (e.g., DTS packages).

The present invention makes use of ETL services 226 of the server 204 through execution of the pump application to extract source elements from a source financial table, such as general ledger table 210, of the source financial database 206, transform at least some of the source elements, and load or pump the source elements into a destination reporter table of the reporter database or data store 208 through the execution of an ETL package 230.

Figure 5:
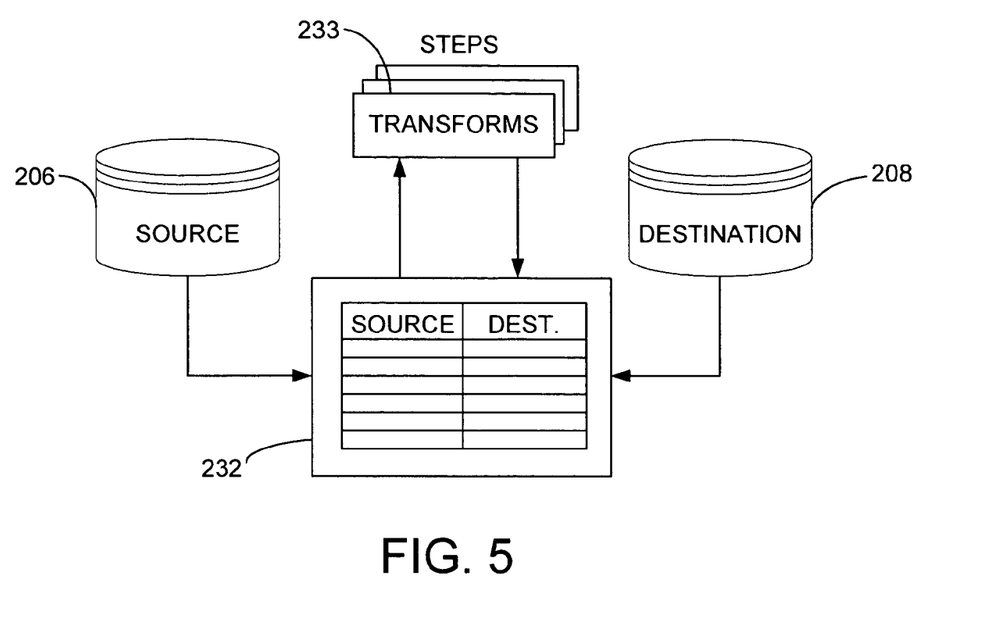
FIG. 5 is a data pump architecture for importing, transforming and exporting data to a destination database.

This operation is depicted schematically in FIG. 5. As each row 216 is pulled from the source table into data pump 232, a transform 233 is applied. The transformed source element can be temporarily stored in a staging table before pumping or loading the transformed source elements into the corresponding destination table of destination database 208. Data pump 232 may be implemented as all or part of an application program 135 comprising instructions executed by a processing unit 120 of a computer system 100, which are shown in FIG. 1.

Figure 6:
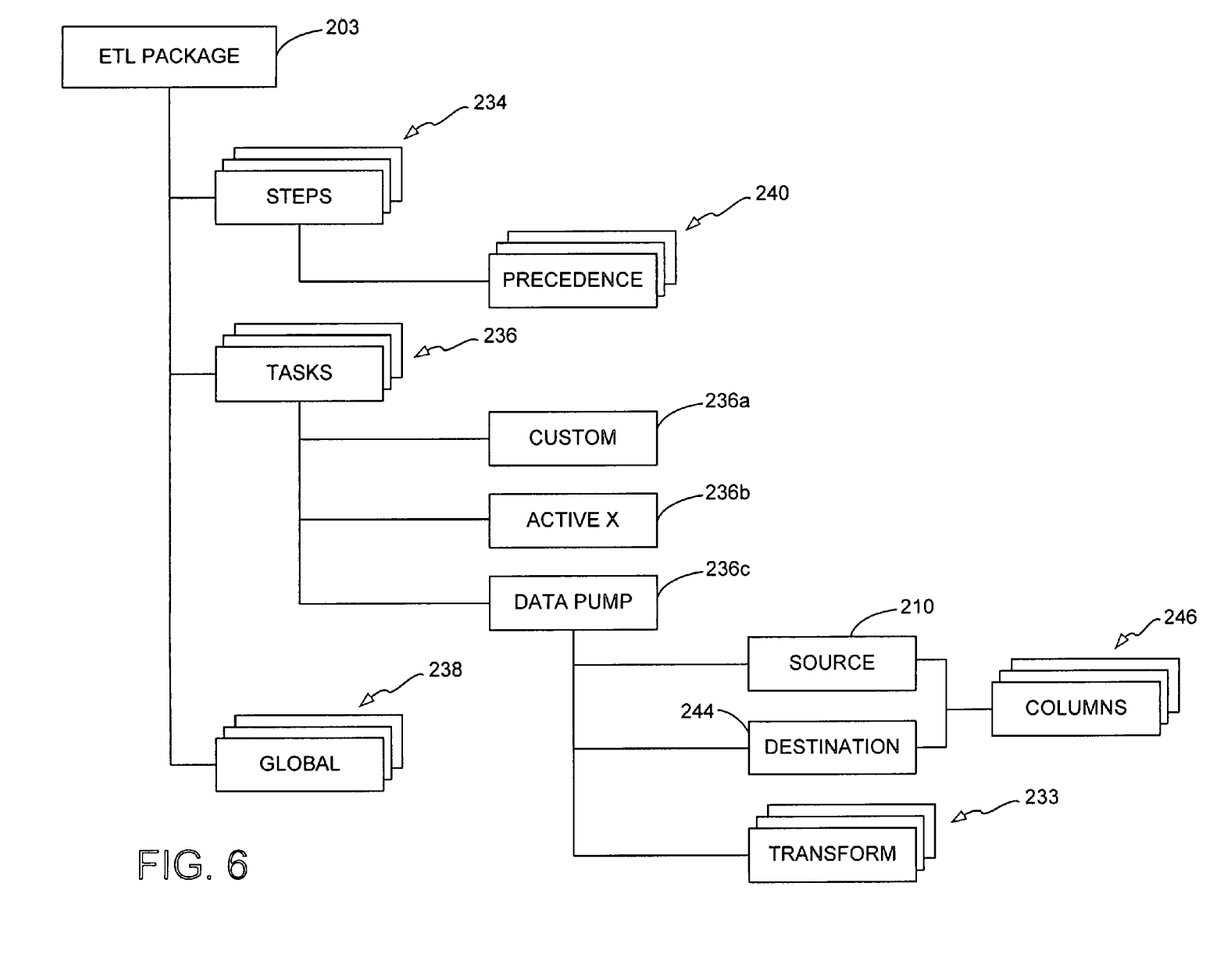
FIG. 6 is a functional diagram of an extraction, transformation and loading (task) module.

FIG. 6 illustrates a functional diagram of a task module or an ETL package 230, which can represent a DTS package of Microsoft® SQL Server. As illustrated, each package 230 comprises steps 234 that define a work flow for the package 230, tasks 236 that perform the actual operations on the data, and global variables 238 that are available system wide. Each ETL package 230 can be stored in a component object model (COM) file.

COM objects are modules designed in accordance with the object-oriented programming model. Object-oriented programming allows the use and re-use of program modules without knowledge of internal state and procedures of the module. Step objects 234 coordinate the flow of control of execution of tasks 236. A task 236 that does not have an associated step 234 object is never executed. The step objects 234 can also establish a precedence constraint 240 that is associated with a corresponding task 236. The precedence constraints are events which must occur prior to execution of the corresponding task 236.

Tasks 236 define actual operations to be performed on data (e.g. by the data pump). For example, tasks 236 may convert the data among formats. Once the data is in a useable format, transformation tasks 236 transform the data before moving it to the destination row. The tasks could be custom procedural scripts 236*a*, ActiveX script 236*b*, or simple data pump transformations 236*c*. A task 236 defines the source table 242 (e.g., general ledger table 210 or database table 212), the destination table 244 of the reporter database 208, and associated columns 246 between the two tables. Additionally, the task 236 includes a transformation algorithm 233 that defines how the data is transformed.

Thus, each ETL package 230, which may be incorporated into a COM based architecture, also allows for the specification of numerous tasks 236, as well as any complex work flow and scheduling relationships among them. Existing processing environments which provide for specification of such work flow and scheduling and precedence relationships require a pre-determined specification (e.g., in the form of a tree) of all such relationships among all tasks. By contrast, COM based ETL packages 230 allow specification of such overall scheduling relationships via specification of precedence and priority for each task separately, one task at a time. Thus, overall scheduling relationships need not be known in advance, so long as precedence constraints for individual steps 234 are known.

Financial reporting software package 202 includes various program modules including an ETL designer module 250, a data refresher module 252, and a reporter application or module 254. Package 202 also includes a user interface 256 through which a user 258 can view and interact with the program modules including providing input to the ETL designer module 250, designing reports, and viewing reports.

Generally, program modules include routines, programs, objects, components, data structures and the like that are stored on a computer-readable medium and perform particular tasks or implement particular abstract data types. Moreover, those skilled in the art will appreciate that the invention may be practiced with other computer system configurations than that described with respect to FIG. 1, including handheld devices, multiprocessor systems, microprocessor-based or programmable consumer electronics, network personal computers, minicomputers, mainframe computers and the like. The invention may also be practiced in distributed computing environments where tasks are performed by remote processing devices that are linked through a communications network. In a distributed computing environment, program modules may be located in both local and remote memory storage devices.

The ETL designer module 250 of the present invention includes a library of classes, interfaces, and value types that are used to programmatically communicate with ETL services 226 through Applications Interface 218 (FIG. 2) to configure an ETL package 230 that is designed to extract and transform data from financial tables of source financial database 206 and load the data into a reporter table of destination reporter database 208 in accordance with a predefined format. The reporter database 208 can be accessed by reporter application 254 to generate reports 259.

Figure 7:
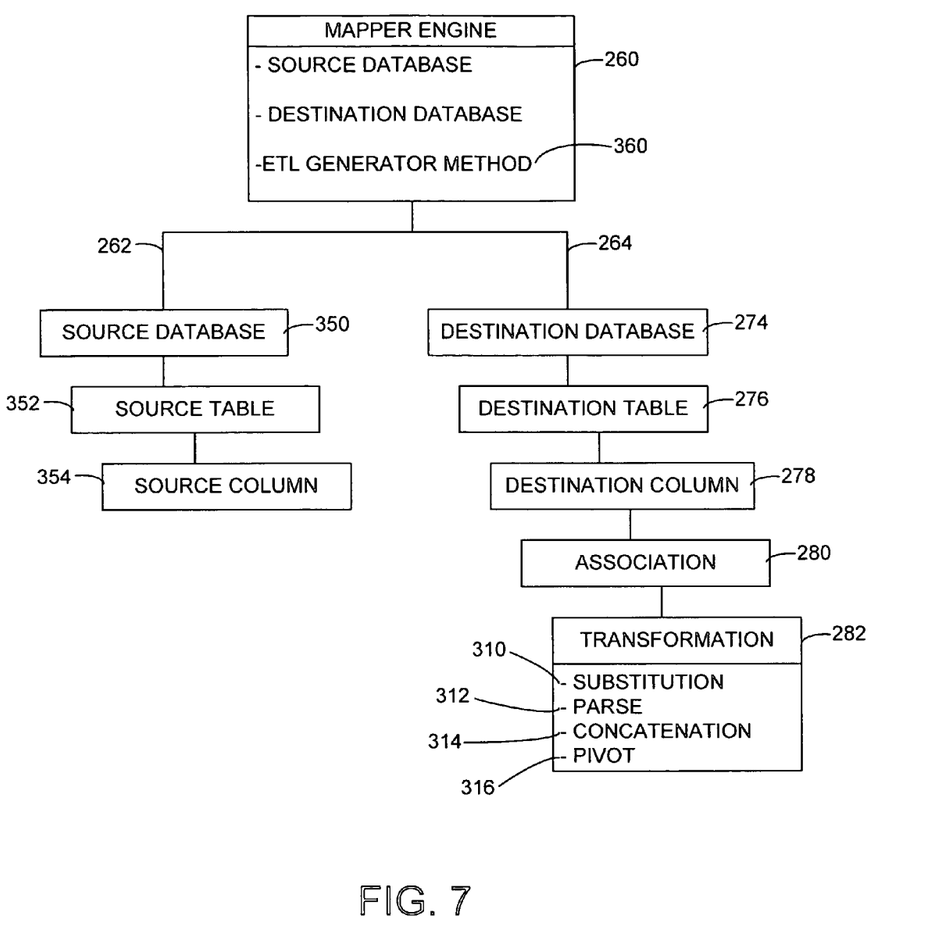
FIG. 7 is an exemplary object model for an ETL designer module in accordance with embodiments of the invention.

An exemplary object model for the ETL designer module 250 is illustrated schematically in FIG. 7. ETL designer module 250 includes a Mapper Engine root class from which a Mapper Engine object 260 is defined or instantiated. The Mapper Engine root object 260 configures source and destination column mappings and transformations. Sibling objects of the Mapper Engine root object 260 are preferably organized in a hierarchical manner within source database and destination database branches 262 and 264.

The source database branch 262 of the Mapper Engine object model generally describes the source table of the source financial database 206. Source database branch 262 includes a source database object 350, a source table object 352, and source column objects 354.

The source database object 350 is defined by, and is an instantiation of a source database class and identifies (i.e., names) a source database, such as source financial database 206.

The source table object 352 is a sibling of the source database object 350 and is defined by, and is an instantiation of, a source table class. The source table object 352 identifies (i.e., names) the source table, such as source financial table 210 (FIG. 3) or 212 (FIG. 4).

The source column objects 354 are siblings of the corresponding source table object 352 and are defined by, and are instantiations of, a source class. The source column objects 354 each identify a column of the source table including the column name (i.e., field) and data type. This information is preferably obtained from the schema of the source table that is received through a communication with source database 206. For the exemplary source table 210 of FIG. 3, source column objects would be generated for each column, such as the Reference, Code 1, Code 2, Date, Debit and Credit columns.

Figure 8:
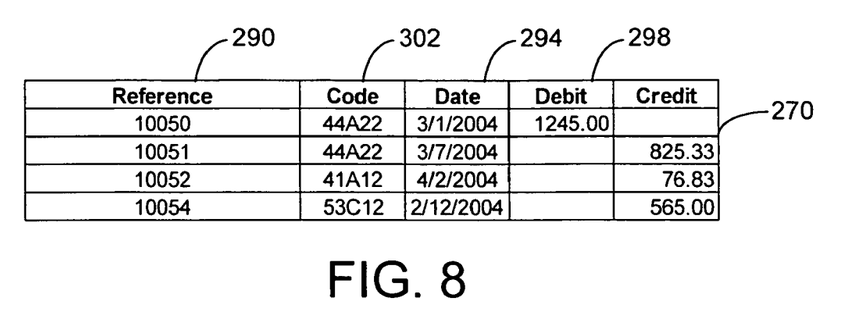
FIGS. 8 and 9 are exemplary destination reporter tables.
Figure 9:
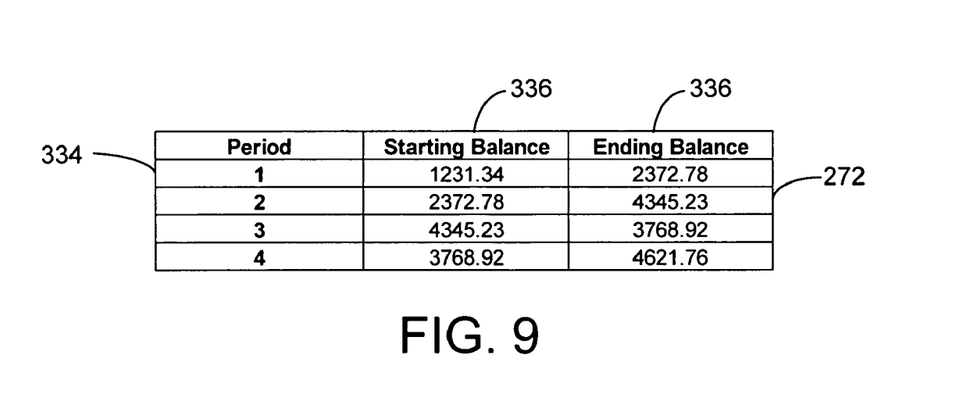

The destination database branch 264 generally describes the destination table of the destination reporter database 208, examples of which are provided in FIGS. 8 and 9. FIG. 8 shows an exemplary reporter table 270 that corresponds to the general ledger table 210 of FIG. 3. FIG. 9 shows an exemplary reporter table 272 that corresponds to the balance table 212 of FIG. 4. Additionally, branch 264 describes associations between columns of the destination table and columns of the corresponding source table of the source financial database 206. Destination database branch 264 includes a destination database object 274, a destination table object 276, destination objects 278, association objects 280, and transformation objects 282.

The destination database object 274 is defined by, and is an instantiation of, a destination database class and identifies (i.e., names) a destination database, such as destination reporter database 208.

The destination table object 276 is a sibling of the destination database object 274 and is defined by, and is an instantiation of, a destination table class. Destination table object 276 identifies (i.e., names) a predefined destination table, such as destination reporter table 270 (FIG. 8) or 272 (FIG. 9). The schema of the destination table is programmed into the ETL designer module 250 based upon the format desired by the reporter application 254.

The destination column objects 278 are siblings of the corresponding destination table object 276 and are defined by and are instantiations of a destination object class. The destination column objects 278 each identify a column of the destination table including column name (i.e., field) and data type. Additionally, the destination column objects 278 are predefined based upon the corresponding destination table and, therefore, are set without any user input. With exemplary reporter table 270 of FIG. 8, destination column objects would be generated for each column, such as the Reference, Code, Date, Debit and Credit columns.

One or more association objects 280 are siblings of each destination column object 278 and are defined by, and are instantiations of, an association class. The association objects 280 each identify an association of a column of the source table, such as general ledger table 210 (FIG. 3), and the corresponding parent destination column object 278 of the destination table. Accordingly, the association objects define a mapping between one or more columns of the source table and a column of the destination table. Thus, at least some of the columns of the destination reporter table will have a corresponding association object 280, each of which correspond to one of the available source columns defined by source column objects 354 of the corresponding source table object 352. For example, in order to map the Reference reporter column 290 to the Reference source column 292, the association object 280 that is a sibling of the destination object 278 identifying the Reference reporter column 290 of reporter table 279 can be linked to the source column object 354 corresponding to the Reference source column 292 of the source financial table 210. In a similar manner, association objects 280 can map the destination Date column 294 to the source Date column 296, the destination Debit column 298 to the source Debit column 300, and so on. Additionally, multiple association objects 280 may be linked to one destination object 278. For example, the destination object corresponding to the destination Code column 302 can have two association object siblings that identify source column objects 354 for the source Code 1 and Code 2 columns 304 and 306, respectively, of the source table.

The transformation objects 282 are siblings of, or correspond to, the association objects 280 and are defined by and are instantiations of a transformation class. In general, the transformation objects 282 are responsible for a transformation of source elements from a source format of the source table columns to a destination format of the associated destination column. The transformation objects 282 define steps and associated tasks that will be programmed into the ETL package 230 to perform the desired transformation.

The transformation objects 282 can be configured to perform substitution 310, parse 312, concatenation 314, and pivot 316 transformations. The substitution transformation 310 generally involves a substitution of at least a portion of the source elements with predefined substitution elements. Typically, the substitutions only modify the format of the source elements while maintaining the value or meaning of the source elements. For example, source financial table 210 includes a Date column 214 having source elements 320 in a source format of MM/DD/YY, whereas the associated destination Date column 294 of reporter table 270 is in a destination format of MM/DD/YYYY. The corresponding transformation object 282 is responsible for the transformation of each of the source elements 320 from the source format of MM/DD/YY to the destination format. Accordingly, this exemplary transformation object 282 operates to convert the year from the two digit format to the four digit format prior to the pumping of the source elements 320 into the destination table 270.

The parse transformation 312 generally involves a parsing or removing of portions of the source elements 320 of a source column to convert them from the source format into the desired destination format for the associated destination column. Thus, the parse transformation 312 is useful when, for example, the source elements 320 correspond to a code that includes multiple pieces of information, such as a client identifier portion and a matter identifier portion, and the corresponding destination column only requires the client identifier portion. Additionally, the parse transformation can be used to eliminate undesired characters. For example, source financial table 210 includes Reference column 292 having a source format of ###-##, whereas the destination format of the corresponding or associated destination Reference column 290 is #####. Accordingly, the corresponding transformation object will perform a parse transformation on the source elements 320 in the column 292 to remove the "-" and thereby transform the source elements into the destination format.

The concatenation transformation 314 generally involves joining two or more source columns that are associated to a single destination column as defined by corresponding association objects 280. For example, a transformation object 282 can be associated to the association objects 280 linking the source Code 1 and Code 2 columns 330 and 332, respectively, of the source table 210 (FIG. 3) to the destination Code column 302 of the destination table 270 (FIG. 8). In this case, the transformation object 282 is responsible for a concatenation of the source Code 1 and Code 2 columns 330 and 332 to convert the source format of separate codes (e.g., "44" and "A22") into the destination format in which the two codes are joined into a single code (e.g., "44A22").

The pivot transformation 316 generally involves transposing the columns and rows of the source table or, in other words, converting column data to row data. For example the source table 212 of FIG. 4 has a source format in which the Periods for the business are organized in columns 214 and the Beginning and Ending Balances are organized in rows 216. Unfortunately, the corresponding destination table 272 (FIG. 9) has a destination format that is the opposite of the source format: the Periods are organized in rows 334 and the Beginning and Ending Balances are organized in columns 336. The pivot transformation 316 operates to transpose the source table elements 320 to match the destination table to thereby provide the desired transformation, which is shown as being complete in FIG. 9.

The Mapper Engine object 260 includes an ETL generator method 360 that, when called, programmatically communicates with the ETL services 226 to generate an ETL package 230 that can be used to perform the desired extraction and transformation of the source data elements of the source table, and load the transformed source data elements into the destination table in accordance with the service and destination related objects of the Mapper Engine object 260. Accordingly, the ETL generator 360 generates instructions, which configure the steps and associated tasks for the ETL package 230 automatically through ETL services 226 (FIG. 2), based upon the Mapper Engine objects, including the setting of precedence and the programming of SQL statements.

Figure 10:
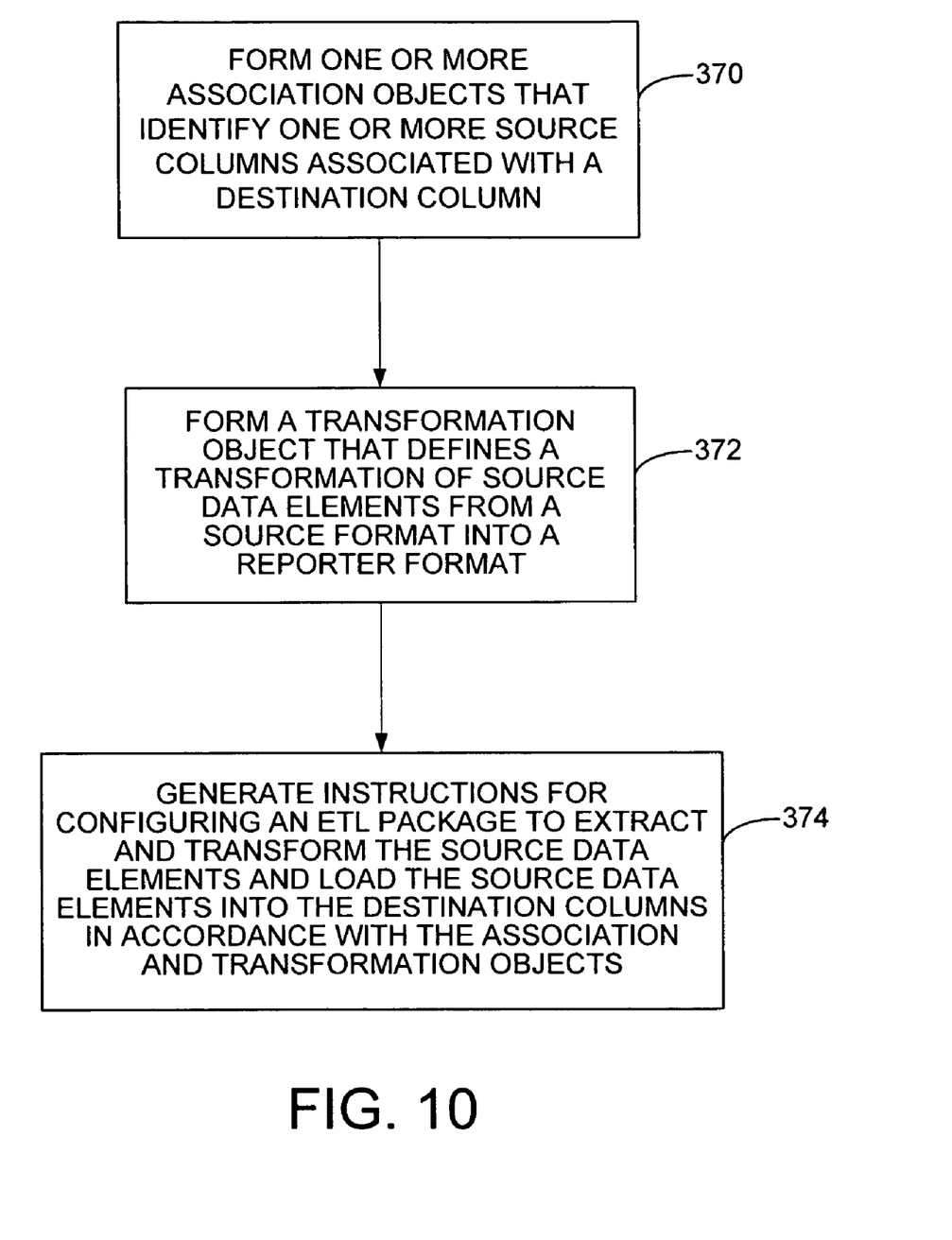
FIG. 10 is a flowchart illustrating a method of configuring an ETL package in accordance with embodiments of the invention.

FIG. 10 is a flowchart illustrating a method of configuring an ETL package 230 in accordance with embodiments of the invention. The method can be performed by ETL designer module 250 of system 200 through the execution of corresponding instructions stored on a computer medium. At step 370 of the method, one or more association objects 280 (FIG. 7) are formed, each identifying one or more source columns of a source financial table (such as general ledger table 210 of FIG. 3) that correspond to, or are associated with, a destination column of the corresponding reporter table (such as reporter table 270 of FIG. 8). The source and destination columns are preferably identified by source and destination column objects, as described above. Next, at step 372, a transformation object 282 (FIG. 7) is formed that defines a transformation of source data elements of at least one of the source columns from a source format into a reporter format of the associated destination column that is identified by the association object. The transformation defined by the transformation object can be any of those discussed above, such as a substitution, a parse, a concatenation, or a pivot. Such transformations are selected in accordance with input from a user 258 (FIG. 2). Finally, at step 374, instructions are generated for configuring an ETL package 230 to extract the source data elements 320 (FIG. 3) of the source column, transform the source data elements into the reporter format in accordance with the transformation object, and load the transformed source data elements into the associated destination columns of the reporter data table in accordance with the association objects. As will be discussed in greater detail below, the method can also include a step of validating that an association object has been completed for required destination columns of the reporter table prior to generating the instructions in step 374.

It is vital that the user properly completes the Mapper Engine object model for the desired ETL operation by defining all of the necessary associations of source and destination columns as well as transformations of the data elements contained in the source columns that are required to convert the data elements into the reporter format of the destination reporter table. If not, the ETL package 230 will be unable to conduct the desired transformation and pump operation resulting in an incomplete destination reporter table.

In accordance with one embodiment of the invention, the destination column objects 278 include "IsRequired" and "IsComplete" properties that are used to ensure that the mappings and transformations have been fully defined for the destination table. The IsComplete property indicates whether or not the object model state is considered complete and the IsRequired property indicates whether it is required to be complete. If the IsRequired property is set to "true", then the IsComplete property will be set to "false" until all the required association objects 280 and transformation objects 282 are set for the destination column object 278. On the other hand, if the IsRequired property is set to "false" then the IsComplete property can be set to "true" since it is not necessary to set association and transformation objects for the destination object. The ETL generator method 360 is only allowed to configure the corresponding ETL package 230 when the IsComplete property for all destination column objects 278 for the destination table object are set to "true".

The setting of the IsRequired property can change based upon various conditions. For instance, if the user indicates that the source table includes a transaction table, the IsRequired property for destination column objects 278 corresponding to columns for such data may change from "false" to "true". In that case, the necessary association and transformation objects for those destination column objects must be completed to change the IsComplete property to "true" before the ETL generator method 360 can be executed.

Based on the IsRequired and IsComplete properties, a task pane can be provided in the user interface 256 (FIG. 2) that indicates the associations and transformations that must be completed by the user before the ETL generator method 360 can be executed. Accordingly, the task pane preferably identifies the destination column object (i.e., destination column) that is incomplete and required and the remaining tasks, such as identifying the associated source column of the source table, or selecting a transformation, that must be completed.

Although the present invention has been described with reference to particular embodiments, workers skilled in the art will recognize that changes may be made in form and detail without departing from the spirit and scope of the invention.

What is claimed is:

1. A method of configuring an Extraction, Transformation and Loading (ETL) package for loading source data elements from a financial table of a financial data store into a reporter table having pre-defined format, the method comprising:
   providing a computer including a processor;
   providing a tangible computer-readable medium;
   providing an Extraction, Transformation and Loading (ETL) designer module stored on the tangible computer-readable medium, the ETL designer module comprising:
   a destination column class defining destination column objects each identifying a destination column of the reporter table;
   an association class defining association objects each identifying an association of at least one source column of the financial table with a destination column identified by a corresponding destination column object; and
   a transformation class defining transformation objects each responsible for a transformation of the source data elements of the source column into a reporter format of the associated destination column as identified by a corresponding association object;

executing the ETL designer module using the processor; and generating instructions for configuring an ETL package, responsive to executing the ETL designer module, comprising:

forming one or more association objects, each of which are instantiations of the association class and identify one or more source columns of the financial table that are associated with a destination column of the reporter table;

forming a transformation object, which is an instantiation of the transformation class and defines a transformation of source data elements of at least one of the source columns from a source format into a reporter format of the associated destination column identified by the association object; and generating instructions for configuring an ETL package to extract the source data elements of the source column, transform the source data elements into the reporter format in accordance with the transformation object, and load the transformed source data elements into the associated destination columns of the reporter data table in accordance with the association objects.

2. The method of claim 1, wherein the transformation includes substituting at least a portion of the source data elements with a predefined substitution element.

3. The method of claim 1, wherein the transformation includes parsing the source data elements.

4. The method of claim 1, wherein the transformation includes concatenating the source data elements of two or more source columns.

5. The method of claim 1, wherein the transformation includes pivoting the source data elements of the source column.

6. The method of claim 1, wherein forming one or more association objects includes receiving a user input defining the association of one or more source columns with a predefined destination column.

7. The method of claim 1, wherein forming a transformation object includes receiving a user input selecting the transformation.

8. The method of claim 1 including a step of validating that an association object has been completed for each destination column of the reporter table prior to generating instructions for configuring an ETL package.

* * * * *